United States Patent [19]

Kalotay et al.

[11] Patent Number: 5,347,874
[45] Date of Patent: Sep. 20, 1994

[54] IN-FLOW CORIOLIS EFFECT MASS FLOWMETER

[75] Inventors: Paul Z. Kalotay, Lafayette, Colo.; Joseph D. Titlow, Palos Verdes Estates, Calif.

[73] Assignee: Micro Motion, Incorporated, Boulder, Colo.

[21] Appl. No.: 8,773

[22] Filed: Jan. 25, 1993

[51] Int. Cl.⁵ .......................... G01F 1/84; G01F 5/00
[52] U.S. Cl. .................................... 73/861.38; 73/202
[58] Field of Search ................ 73/861.37, 861.38, 202

[56] References Cited

U.S. PATENT DOCUMENTS

| | | | |
|---|---|---|---|
| 3,927,565 | 12/1975 | Pavlin | 73/861.38 X |
| 4,420,983 | 12/1983 | Langdon | 73/861.38 |
| 4,831,885 | 5/1989 | Dahlin | 73/861.38 |
| 5,044,207 | 9/1991 | Atkinson et al. | 73/861.37 |
| 5,048,351 | 9/1991 | Dames | 73/861.38 |

*Primary Examiner*—Herbert Goldstein
*Attorney, Agent, or Firm*—Duft, Graziano & Forest

[57] ABSTRACT

A mass flowmeter has a flow tube inserted within the confines of a conduit containing a material flow. Mass flow information is derived for the material flow within the conduit by generating mass flow information for the material flowing within the smaller flow tube positioned within the conduit and then by adjusting the calculations for the flow tube to represent mass flow information for the conduit. In accordance with a first embodiment of the invention, a pressurized cover is positioned around the flow tube to isolate the exterior surface of the flow tube from the material in the conduit. The space between the exterior of the flow tube and the cover is pressurized to a pressure equal to that of the material in the conduit. Both sides of the flow tube walls are at the same pressure so that a flow tube comprised of thinner and more flexible material may be used. In accordance with a second embodiment of the invention, the cover is not used and the flow tube is inserted directly into the conduit and the exterior walls of the flow tube are in contact with the material within the conduit. This embodiment is advantageous in applications in which the conduit material is of low viscosity. The embodiment with the pressurized cover is ideally suited for use in applications with heavy viscosity material.

26 Claims, 3 Drawing Sheets

IN-FLOW CORIOLIS EFFECT MASS FLOWMETER

FIELD OF THE INVENTION

The present invention relates to Coriolis effect mass flowmeters. More particularly, the invention relates to a method and apparatus for generating mass flow information for material flow in a large conduit by measuring the material flow in a smaller flow tube inserted into a larger conduit.

STATEMENT OF THE PROBLEM

Coriolis flowmeters directly measure the rate of mass flow through a conduit. As disclosed in the art, such as in U.S. Pat. Nos. 4,491,025 (issued to J. E. Smith et al on Jan 1, 1985 and hereinafter referred to as the U.S. Pat. No. 4,491,025) and Re. 31,450 (issued to J. E. Smith on Feb. 11, 1982 and hereinafter referred to as the U.S. Pat. No. Re. 31,450), these flowmeters have one or more flow tubes of straight or curved configuration. Each flow tube configuration in a Coriolis mass flowmeter has a set of natural vibration modes, which may be of a simple bending, torsional or coupled type. Fluid flows into the flowmeter from an adjacent pipeline on the inlet side, is directed to the flow tube or tubes, and exits the flowmeter through the outlet side of the flowmeter. The natural vibration modes of the vibrating, fluid filled system are defined in part by the combined mass of the flow tubes and the fluid within the flow tubes. Each flow conduit is driven to oscillate at resonance in one of these natural modes.

When there is no flow through the flowmeter, all points along the flow tube oscillate with identical phase. As fluid begins to flow, Coriolis accelerations cause each point along the flow tube to have a different phase. The phase on the inlet side of the flow tube lags the driver, while the phase on the outlet side leads the driver. Sensors can be placed on the flow tube to produce sinusoidal signals representative of the motion of the flow tube. The phase difference between two sensor signals is proportional to the mass flow rate of fluid through the flow tube. A complicating factor in this measurement is that the density of typical process fluids varies. Changes in density cause the frequencies of the natural modes to vary. Since the flowmeter's control system maintains resonance, the oscillation frequency varies in response. Mass flow rate in this situation is proportional to the ratio of phase difference and oscillation frequency.

U.S. Pat. No. Re. 31,450 discloses a Coriolis flowmeter that avoided the need of measuring both phase difference and oscillation frequency. Phase difference is determined by measuring the time delay between level crossings of the two sinusoidal signals. When this method is used, the variations in the oscillation frequency cancel, and mass flow rate is proportional to the measured time delay. This measurement method is hereinafter referred to as a time delay measurement.

In the prior art, including Smith, flow tubes must be rigid. The tube walls are made thick enough to keep the pressure and bending stresses to an allowable level. This requirement is undesirable, since thick walls produce Coriolis flowmeters with low sensitivities. The flow tubes must be also large enough to carry the entire flow of a supply conduit without undue restriction or pressure drop. For flows typical in large pipelines, this results in impractical flowmeter dimensions and costs.

Similarly, it is not practical to use measurement techniques whereby a flow tube is operated in a bypass line and not directly in the main conduit. The reason is that it is difficult to create conditions wherein the bypass flow remains always in the same exact proportions to the main flow, regardless of flowrate in the main flow path. These conditions would have to be extant in order for the measurement of the bypass flow alone to be used in computing the flow in the main conduit.

Another problem of currently available Coriolis flow measurement apparatus is their limited suitability to gas applications. Gases are less dense than liquids and consequently, at the same flow velocities, smaller Coriolis forces are generated. This situation requires a higher sensitivity flowmeter. Alternatively, a flowmeter with conventional sensitivity could be used, if the flow velocity is increased to achieve the same Coriolis accelerations. Unfortunately, this alternative leads to a flowmeter whose sensitivity is not constant.

SOLUTION

The present invention overcomes the above problems and achieves an advance in the art by providing an improved method of and apparatus for measuring the mass flow of materials through a conduit. In accordance with the present invention, mass flow information for flow in a large conduit is generated by inserting a relatively small flow tube within the conduit. The small flow tube operates as a Coriolis effect mass flowmeter by generating Coriolis accelerations due to the flow both internal and external to the flow tube. These Coriolis accelerations are additive and produce a very sensitive flowmeter. Drivers and sensors are associated with the small flow tube to generate the mass flow information for the material flow within the flow tube. The ratio of the total flow in the conduit to the flow inside the smaller flowtube is constant and defined. The output information of the inserted flowmeter is then adjusted in accordance with the small portion of the material that flows through the flow tube as compared to the portion of the material that flows through the conduit to derive accurate mass flow information for the conduit.

The use of a small flow tube inserted within a larger conduit resolves the above-discussed problems associated with prior Coriolis flowmeters. Inserting the small flow tube into the material flowing in the larger conduit eliminates pressure differential problems since the inside and outside surfaces of the inserted flow tube are at the same pressure as the material flowing in the conduit. By eliminating this pressure differential, the small flow tube may be made of thinner and less rigid material than is the case when the outside of the flow tube is at atmospheric pressure. A thinner and more flexible flow tube is more suitable for the generation of meaningful Coriolis forces. In addition, there is no need to interrupt the flow in the conduit to install a relatively large and expensive structure to measure flow. The insertion-type Coriolis mass flowmeter disclosed herein becomes practical for large pipe-dimensions which can not economically served by the currently available largest Coriolis mass flowmeter (pipe diameter of 8 inches or larger).

As shown on the drawings, the effective cross sectional area of the flow tube is small compared to the effective cross sectional area of the conduit into which the flow tube is inserted. The exact size of the flow tube is not critical. However, it should not be so small that it is difficult to manufacture and/or of delicate construction that requires special care and handling. The selected size may then be used in any application involving a conduit whose effective cross sectional area is large relative to the effective cross sectional area of the flow tube.

The insertion of the small flow tube into the material flow within the conduit overcomes the temperature differential problems along the length of the tube, as above-discussed, by permitting all portions of the flow tube to be at same temperature namely, the temperature of material flow within the conduit. As a result, the mass flow measurements for straight tube meters using this inserted flow tube are simpler than heretofore.

The use of thinner and more flexible material for the flow tube walls, as above-discussed, results in the provision of a more efficient Coriolis effect flowmeter since the more flexible material results in the generation of a greater Coriolis effect in the flow tube in response to a given drive signal. This increased sensitivity permits the flow tube to be better adapted for use in the mass flow measurement of less dense media like gases.

The flow tube can be located anywhere within the conduit for flow measurements where Reynolds-numbers indicate that turbulent flow is present. However, when the flow within the conduit becomes laminar (Reynolds numbers below 4000), the flowtube should be located in the geometric center of the large conduit to achieve the best possible accuracy.

In a first possible preferred embodiment, a flow tube positioned within a larger conduit is surrounded by a cover that isolates the exterior of the flow tube from contact with the material flowing within the conduit. A pressure controller supplies sufficient air pressure inside the cover so that the exterior surface of the flow tube is at essentially the same pressure as that of the material flowing within the flow tube and the conduit. Both sides of the flow tube are thereby maintained at the same pressure, namely the pressure of the material in the conduit. The walls of the flow tube can then be relatively thin, resulting in a mass flowmeter of increased sensitivity.

In accordance with another possible preferred embodiment of the invention, a small diameter flow tube is inserted within a larger conduit with the flow tube being supported only at its middle portion by a magnetostrictive driver. The flow tube is unsupported at its ends which are associated with sensors. The sensors detect the movement of the flow tube resulting from the Coriolis accelerations generated by the combined effects of the transverse movement imparted by the driver and the material flow internal and external to the flow tube.

DETAILED DESCRIPTION

Figure 1:
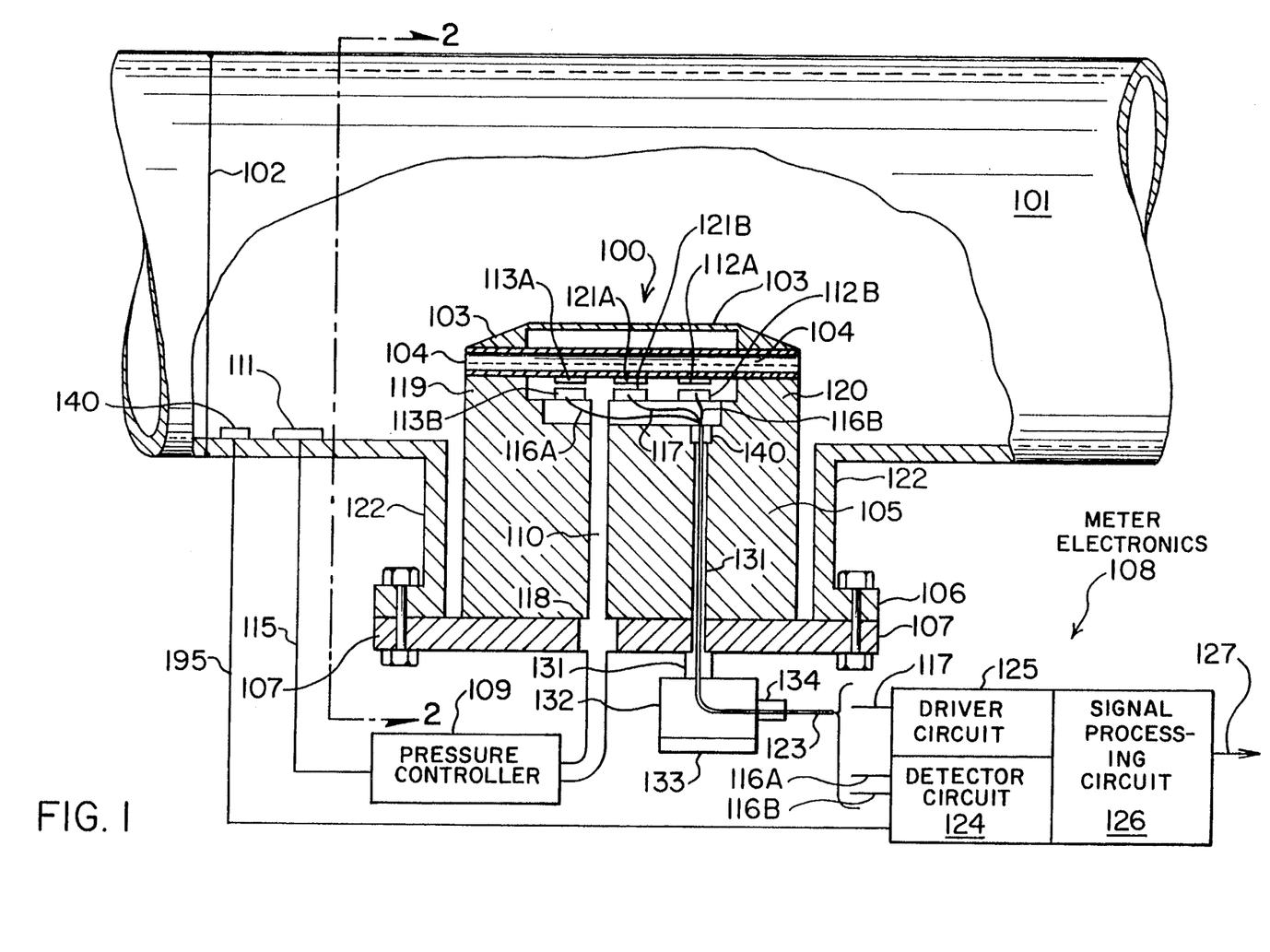
FIG. 1 shows a side cut-away view of one possible exemplary preferred embodiment of the present invention.
Figure 2:
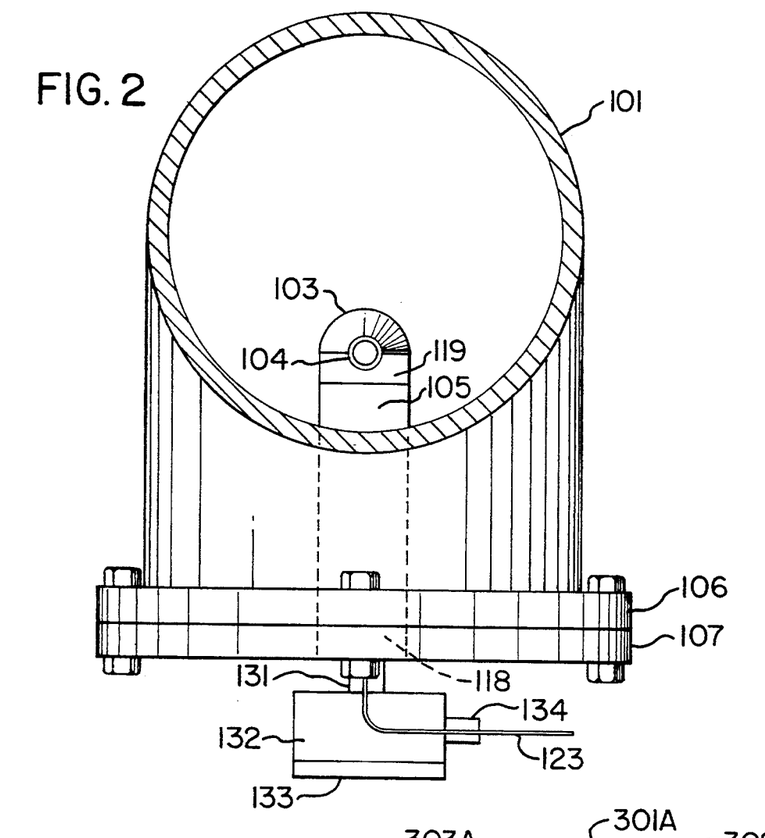
FIG. 2 shows a cut-away, end-on view taken along line 2—2 of the embodiment of FIG. 1.

FIGS. 1 and 2 disclose a conduit 101 having a flow tube 104 positioned within the conduit with the longitudinal axis of the flow tube being parallel to the longitudinal axis of the conduit. Flow tube 104 is surrounded by cover 103. Flow tube 104 is affixed at its ends to support elements 119 and 120 which are part of support structure 105. A driver 121 is associated with the center portion of flow tube 104. Driver 121 comprises a magnet 121A affixed to the center portion of flow tube 104 and a drive coil 121B affixed to support structure 105. Drive coil 121B is energized by a drive current from driver circuit 125 over path 117 of cable 123 to impart a transverse oscillatory motion to flow tube 104. A left sensor comprising magnet 113A and sensing coil 113B and a right sensor comprising magnet 112A and a sensing coil 112B are associated with flow tube 104 to the left and right, respectively, of driver 121. Magnets 112A and 113A are affixed to flow tube 104. Sensing coils 112B and 113B are affixed to support structure 105.

Conduit 101 is fitted an its lower surface with a T-shaped branch comprising a tube section 122 and a connection flange 106 for receiving the flow tube 104 and its associated apparatus including flow tube cover 103 and its support structure 105.

The flowmeter support structure 105 includes a flowmeter base flange 107. The flow tube 104 ends are attached to support elements 119 and 120 of the meter support structure 105 which are of sufficient rigidity to keep the ends of flow tube 104 stationary at all times.

The portion of the flow tube between the support elements 119 and 120 oscillates transversely in response to the energization of drive coil 121B. Coils 113B and 112B sense the velocity of the transverse oscillations of the flow tube. If there is no material flowing through the flow tube, the output signals of these sensors are identical. When material flows through the flow tube while it is oscillating, the output of sensor 113B and is identical with 112B except there is now a small phase lag in the signal from sensor 113B and a small phase lead in the signal from sensor 112B. These phase changes are due to the Coriolis accelerations and the total phase difference is proportional to the mass flow internal to the flow tube 104. The mass flow external to the flow tube 104 is not sensed due to cover 103.

Figures 3, 8:
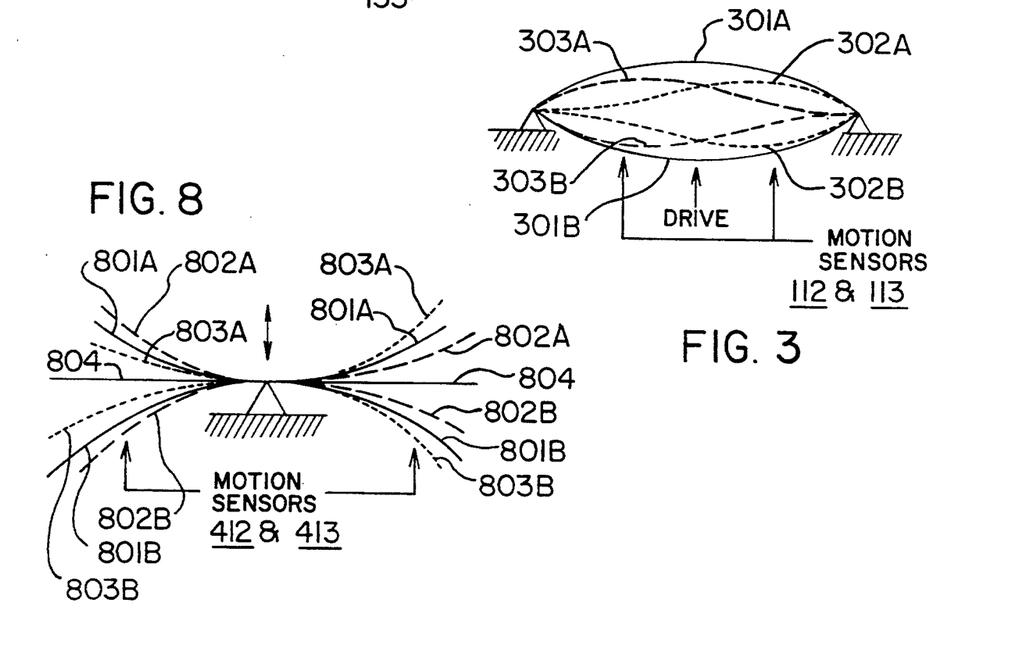
FIG. 3 shows various shapes a flow tube can assume as it is altered by the Coriolis effects of material flow through the flow tube.
FIG. 8 shows various shapes of the flow tube of FIG. 4 can assume as it is altered by the Coriolis effects of a material flow in the flow tube.

FIG. 3 illustrates the vibrational pattern of flow tube 104 as it is vibrated at its fundamental frequency by driver 121 as well as depictions of the vibrational patterns assumed by the flow tube as a result of the generated Coriolis forces. Pattern 301 having a top portion 301A and a lower portion 301B illustrates the oscillatory movement imparted to flow tube 104 by driver 121 for a zero flow condition. Patterns 302 and 303 illustrate the vibrational patterns generated by the combined effects of the driver 121 and the generated Coriolis forces. Pattern 302 has a top portion 302A and a lower portion 302B. Pattern 303 has a top portion 303A and a lower portion 303B. Coming down from the top maximum deflection, at the time when the middle point of the flow tube traverses through the line defined by the endpoints of the tube, the flow tube has the oscillatory pattern represented by elements 303A. Similarly, 303B is the oscillatory pattern during the travel upward from the bottom maximum position of the flow tube. These two patterns represent the left-most deviation of the amplitude peaks of the flow tube at zero line crossing, assuming the flow takes place from left to right. Similarly, the pattern elements 302A and 302B represent flow tube shapes at the time of centerpoint zero crossing during their traverse toward the top or bottom maxima. The generated Coriolis forces cause the shape of the tube deflection to change between the right-most excursion represented by pattern 303 and the left-most excursion represented by pattern 302. The left and right tube halves are delayed in time by differing amounts with respect to each other, as a function of mass flow rate. Thus, with respect to pattern 302 at no flow condition, during flow conditions, the tube left side has a different velocity at reference plane crossing than the right side as depicted by the different amplitudes of pattern 302A and 302B. Similarly, pattern elements 303A and 303B represent the other deviation extreme caused by the Coriolis forces. The different velocities cause a delay between the velocity signals generated in the sensor coils. The patterns of FIG. 3 are shown in exaggerated form to facilitate the understanding thereof.

Sensor coils 113B and 112B on FIG. 1 detect the velocity of the flow tube—as affected by the Coriolis force when material is flowing—and transmit corresponding velocity signals over conductors 116A and 116B and cable 123 to detector circuit 124 of meter electronics 108. Cable 123 extends through conduit box 132 and channel 131 of support structure 105. Detector circuit 124 responds to the reception of these signals from cable 123 and outputs information to signal processing circuit 126 which generates mass flow information pertaining to the material flow in the conduit. Element 140 is a pressure seal to prevent the leakage of air into channel 131 from the pressurized atmosphere within cover 103.

Conduit box 132 having an access cover 133 is affixed by means of threaded connections 131 to the bottom of flowmeter base flange 107 and by threaded connection 134 to a conduit containing cable 123 extending to driver circuit 125 and detector circuit 124.

Signals 116A and 116B from the sensors 113B and 112B represent the instantaneous velocity of the portions of flow tube 104 associated with sensor coils 112B and 113B. As taught in the aforementioned Smith reissue patent, the sensors are used to sense the velocity of points on the flow tube caused by the displacement of the vibrating flow tube due to the combined effect of the Coriolis force and the oscillating movement of driver 121 as material flows therethrough.

Signals 116A and 116B representing the time differential At between the movements of corresponding portions of tube 104 with respect to each other are applied to detector circuit 124 and then to signal processing circuit 126 which generates mass flow information for material flowing within conduit 101. Detector circuit 104 and signal processing circuit 126 generate information pertaining to the mass flow rate of the material through tube 104. However, since the relationship between that portion of the material in conduit 101 and that portion which flows through flow tube 104 is known, signal processing circuit 126 uses this relationship and generates and applies to conductor 127 information representing the mass flow information for the total material flowing in conduit 101.

Cover 103 surrounds flow tube 104 to isolate flow tube 104 from the material flowing in conduit 101. This is necessary in applications in which the viscosity of the material flowing in tube 101 is such that its direct contact with the exterior of flow tube 104 would disadvantageously influence the movement imparted to flow tube 104 by the generated Coriolis forces- It is desirable that this Coriolis movement be as large as possible in order to obtain meaningful measurements and, in addition, that it not be influenced by the viscosity of the fluid surrounding it. Such would not be the case if the Coriolis movement of the flow tube 104 was affected by the viscosity of the material flowing in conduit 101. Cover 103 isolates flow tube 104 from the material flowing in conduit 101.

Cover 103 is pressurized by pressure controller 109 whose air output is connected via pressure equalization tube 110 to the void comprising the space between the exterior of flow tube 104 and the inner surface of cover 103. Pressure equalization tube 110 extends from the output of pressure controller 109 and proceeds upward on FIG. 1 through the support structure 105 to the airspace surrounding the exterior of flow tube 104. Pressure controller 109 is supplied with input information from sensor 111 over path 115 regarding the pressure of the material flowing within conduit 101. Pressure controller 109 receives this pressure information from sensor 111 and applies an output pressure via pressure equalization tube 110 that pressurizes the inner surface of cover 103 so that the base surrounding the exterior of flow tube 104 is at the same pressure as is the material flowing within conduit 101. Since a portion of the material flowing in conduit 101 also flows through flow tube 104 with the same pressure, the inside and outside walls of flow tube 104 are at essentially the same pressure and therefore, a near zero pressure difference exists between inner and outer walls of flow tube 104.

Cover 103 is of such shape and dimension so as to allow flow tube 104 to oscillate transversely without interference and without being affected by the viscosity of the material flowing in tube 101. Since a zero pressure difference exists between the inner and outer walls of flow tube 104, the flow tube may be made of relatively thin material to provide for increased measurement sensitivity.

A particle filtration screen 102, if desired may be positioned in the conduit upstream from the flowmeter so as to remove potentially damaging particles from the flow material.

Meter electronics 108 is not shown in detail since such details are not a part of the invention. If desired, meter electronics 108 may comprise the mass flow rate electronics element 20 shown in detail on FIGS. 1, 2, and 3 of U.S. Pat. No. 4,879,911 of Nov. 14, 1989, to Michael J. Zolock and assigned to the assignee of the present invention. The temperature information of Zolock is provided by temperature sensor 140 over path 195 which extends to detector circuit 124 of FIG. 1.

Figures 4, 5, 6, 7:
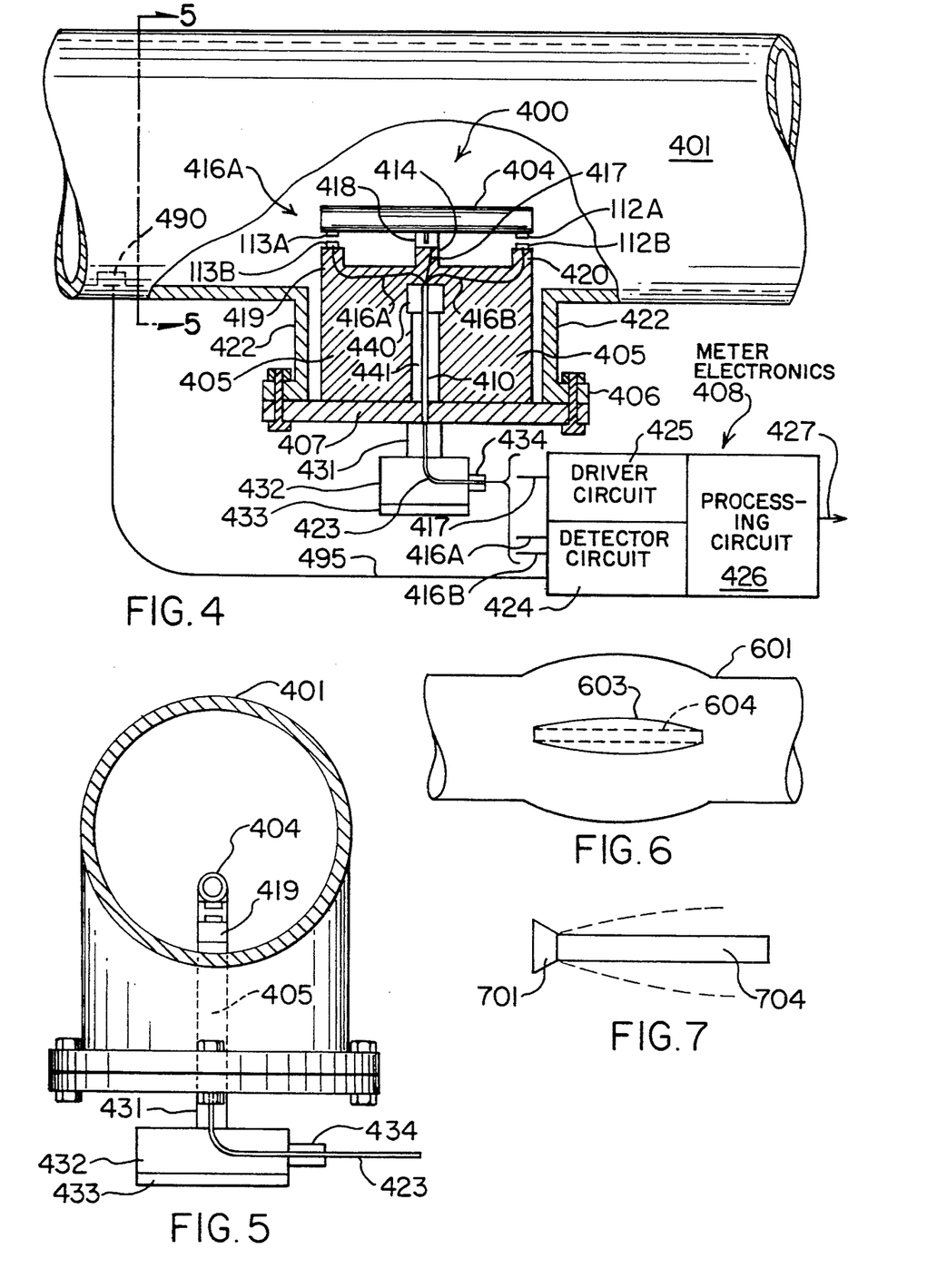
FIG. 4 shows a side cut-away view of another possible exemplary preferred embodiment of the present invention suited to mass flow rate measurements of low viscosity materials.
FIG. 5 shows a cut-away, end-on view taken along line 5—5 of the embodiment of FIG. 4.
FIG. 6 shows the conduit of FIG. 1 altered to accommodate flow profile modifications.
FIG. 7 shows an alteration to the flow tube of FIG. 1 to increase its material flow.

FIGS. 4 and 5

FIGS. 4 and 5 depict an alternative exemplary preferred embodiment of the invention that is suited to applications involving mass flow measurements of low density and low viscosity materials such as gases and the like. It is similar to the exemplary embodiment of FIG. 1 with a few exceptions. The embodiment of FIGS. 4 and 5 is depicted as a section of conduit 401 with a mass flowmeter 400 inserted inside the interior of conduit 401. This conduit section may be mated to appropriate sections of a supply conduit (not shown). As in FIG. 1, a flow tube 404 is positioned within material flowing through the conduit 401. Flow tube 404 is supported at its center by a magnetostrictive driver 418 which is mounted on support 414 of flowmeter support structure 405. Magnetostrictive driver 418, in addition to supporting flow tube 404, oscillates flow tube 404 at its natural resonant frequency, transversely at its midpoint. The ends of the flow tube are free to vibrate up and down due to the vibrations induced by the drive force.

A magnet 112A and 113A is affixed to each end of flow tube 404. Under each magnet, mounted on the flowmeter support structure 419 and 420, are sensor coils 113B and 112B. The ends of flow tube 404 oscillate up and down due to the forces imparted by the magnetostrictive driver 414. Sensor coils 113B and 112B sense the velocity of the magnets 112A and 113 A as their velocity it varies due to the vibrational and Coriolis forces and generate voltage signals proportional to this velocity. The normal (zero flow) oscillation of the flow tube due to the force imparted by only the magnetostrictive driver 418 is similar to a beam deflecting under load. With material flowing in the flow tube, the generated Coriolis forces alter the timing relationship between the deflections in proportion to the mass flow rate within the vibrating flow tube. This is shown in exaggerated form in FIG. 8. Essentially similar to FIG. 3, the depicted shapes show the tube shapes at the time of reference plane crossing, during their upward and downward movement, without and with flow through flowtube 404.

In the exemplary embodiment of FIG. 4, because of the lower viscosity material (gas or liquid) flowing in conduit 401 the need for the cover 103 of FIG. 1 and the related pressure equalization apparatus is eliminated. The low viscosity material does not significantly affect the flow tube oscillations and therefore no flow tube cover is required. The pressures on the inside and outside walls of the flow tube are inherently equal. This permits the use of a flow tube 404 having thinner walls and the need for a lower drive force.

Driver circuit 425, detector circuit 424, and processing circuit 426 operate in a manner similar to their counterparts of FIG. 1 to drive flow tube 404 and measure its Coriolis movement to generate information about mass flow rate in conduit 401. Element 440 is a pressure seal to prevent the flow of pressurized material from conduit 401 to channel 441.

FIG. 8

FIG. 8 illustrates, in exaggerated form, a vibrational pattern of flow tube 404 driven at its fundamental resonant frequency by driver 414 as well as the vibrational patterns assumed by the flow tube as a result of the generated Coriolis forces. Pattern 802 has a top portion 802A and a lower portion 802B. Pattern 803 has a top portion 803A and a lower portion 803B. At the time when the center of the tube is at the center of its movement, during its travel downward from the top, the flow tube has the oscillatory pattern represented by 803A. 803B is the oscillatory pattern during the travel upward from the bottom position of the flow tube. This represents the right-most deviation of the amplitude peaks of the flow tube, assuming the flow takes place from left to right. Similarly, the pattern elements 802A and 802B represent flow tube shapes during their traverse toward top or bottom maxima. The combination of the driven vibration and the generated Coriolis forces cause the shape of the tube deflection in a given point in time to change between the right-most excursion represented by pattern 803 and the left-most excursion represented by pattern 802. As shown by these patterns, the left and right tube ends are delayed in time by differing amounts with respect to each other from the reference plane 804, due to the Coriolis forces. Thus, as opposed to pattern 802 showing a no-flow condition, during flow conditions the tube left end velocity is different from the velocity of the right end, as shown by the shapes of pattern 802A and 802B. Pattern elements 803A and 803B represent the other deviation extreme caused by the Coriolis forces during the other half vibratory cycle. The Coriolis forces create this time delay between the velocities of the flow tube ends, as shown by patterns 802A and B, and 803A and B. The velocity difference is represented by the time delay between the output signals of coils 112B and 113 B. The signals are forwarded to detector circuit 424 in a manner similar to the one depicted in FIG. 1.

FIG. 6 discloses an embodiment of the invention wherein conduit 601 has a mid-portion of increased diameter with respect to the remainder of the conduit. The sides of this mid-portion are semi-circular and match the semi-circular cover 603 which surrounds flow tube 604 positioned within the conduit 601. Conduit 601, flow tube cover 603, and flow tube 604 are similar in most respects to conduit 101, cover 103 and flow tube 104, respectively. The top and bottom surfaces of cover 603 are semi-circular in configuration. The mid-portion of conduit 601 is of slightly greater diameter than the remainder of the conduit and is configured to be semi-circular to match the semi-circular configuration of the flow tube cover 603. This widened portion of conduit 601 facilitates material flow through the conduit 601 and around flow tube cover 603. This portion of greater diameter provides a flow path of less impedance around flow tube cover 603 than would be the case if conduit were of a fixed diameter. The area of increased diameter compensates for the material flow impedance provided by cover 603. This permits the fluid flow within conduit 601 to be laminar around the portions of the flow tube where the material flow is diverted around flow tube cover 603.

FIG. 7 shows a flow tube 704 having a funnel-shaped opening 701 on its left end. Flow tube 704 maybe positioned within a flow conduit such as conduit 101 in FIG. 1. The purpose of the funnel shaped end 701 is to increase the amount of material flow, and hence the velocity of flow, through the tube 704 when it is positioned in the larger conduit such as conduit 101 or 601. The dashed lines to the right of the funnel section 701 represent a cover membrane such as membrane 603 of FIG. 6. If desired, the flow tube 704 may be positioned within a conduit such as 601 having a center portion of increased diameter in order to maintain laminar material flow around the sides of flow tube 704. The increased flow velocity provided by end 701 increases the sensitivity of flow tube 704 to Coriolis forces.

It is expressly understood that the claimed invention is not to be limited to the description of the preferred embodiment but encompasses other modifications and alterations within the scope and spirit of the inventive concept. Thus the detectors 112, 113 may be of any suitable type including optical, position, acceleration or velocity. The driver 121 may be of any suitable electromagnetic type.

We claim:

1. Apparatus for deriving mass flow information for material flowing in a conduit, said apparatus comprising:
   a non-movable conduit for enabling material flow therein in a direction substantially parallel to the longitudinal axis of said conduit;
   a flow tube positioned inside said conduit with the longitudinal axis of said flow tube being non-movable and substantially parallel to said longitudinal axis of said conduit for enabling the flow through said flow tube of a portion of said material flow through said conduit and the effective cross sectional area of said flow tube being relatively small compared to the effective cross sectional area of said conduit;
   drive means for oscillating of said flow tube transversely with respect to its longitudinal axis;
   sensor means for detecting the transverse flexing motion of portions of said flow tube caused by the Coriolis forces on said flow tube resulting from the flow of said material through said flow tube along its longitudinal axis as said flow tube is oscillated by said drive means;
   signal processing means; and
   means for applying output signals from said sensor means to said signal processing means for the generation of mass flow information pertaining to said material flow through said conduit.

2. Apparatus for deriving mass flow information for material flowing in a conduit, said apparatus comprising:
   a non-movable conduit for enabling material flow therein in a direction substantially parallel to the longitudinal axis of said conduit;
   a substantially straight flow tube positioned inside said conduit and having a non-movable longitudinal axis substantially parallel to said longitudinal axis of said conduit;
   said flow tube being effective to enable the flow therethrough of a portion of said material flow through said conduit;
   drive means affixed to a longitudinal center of said flow tube for imparting a transverse oscillatory motion to a portion of said flow tube;
   said flow tube being devoid of attachment to any structure other than said drive means;
   sensor means associated with said flow tube for detecting the transverse flexing motion of said flow tube caused by the Coriolis forces resulting from the flow of said material through said flow tube as said flow tube is oscillated transversely by said drive means;
   signal processing means; and
   means for applying output signals from said sensor means to said signal processing means for the generation of mass flow information pertaining to said material flowing through said conduit.

3. The apparatus of claim 2 wherein said drive means comprises a magnetostrictive driver.

4. The apparatus of claim 2 wherein the exterior surface of said flow tube is in contact with material flow through said conduit for enabling said flow tube to respond to Coriolis forces generated by material flow on both its inner and outer surfaces.

5. The apparatus of claim 2 wherein said sensor means comprises:
   a first sensor positioned near one end of said flow tube;
   a second sensor positioned near a second end of said flow tube; and
   means for applying separate signals from each of said first and second sensors to said signal processing means with said separate signals representing the separate transverse movement of portions of said flow tube resulting from said generated Coriolis forces; and
   said signal processing means being responsive to said application of said separate signals for deriving said mass flow information.

6. Apparatus for deriving mass flow information for material flowing through a conduit, said apparatus comprising:
   a substantially straight flow tube positioned inside said conduit and having a longitudinal axis substantially parallel to a longitudinal axis of said conduit;
   said flow tube being effective to enable the flow therethrough of a portion of material flow through said conduit;
   drive means associated with said flow tube for imparting a transverse oscillatory motion to a portion of said flow tube;
   sensor means associated with said flow tube for detecting a transverse motion of said flow tube caused by the Coriolis forces resulting from the flow of said material through said flow tube as said flow tube is oscillated transversely by said drive means;
   a cover surrounding said flow tube to isolate said flow tube from material in said conduit whereby the transverse movement of said flow tube is unaffected by the viscosity of said material external to said flow tube is said conduit;
   signal processing means; and
   means for applying an output signal from said sensor means to said signal processing means for the generation of mass flow information pertaining to said flow through said conduit.

7. The apparatus of claim 6 wherein said apparatus further includes pressure control means comprising:
   means for sensing the pressure of said material flowing in said conduit; and
   means for maintaining an air space between the interior surface of said cover and the exterior surface of said flow tube with said air space having a pressure substantially equal to the pressure of said material flowing in said conduit.

8. The apparatus of claim 6 wherein:
   said drive means is connected to a mid portion of said flow tube;
   wherein said apparatus further comprises a support means connected to a first end and a second end of said flow to inhibit transverse movement of said ends of said flow tube; and
   wherein said sensor means comprises a first and a second sensor each of which is connected between said drive means and said support means.

9. The apparatus of claim 8 in combination with:
   means for applying separate signals from each of said first and second sensors to said signal processing means with said signals representing the separate transverse movement of said portions of said flow tube associate with said sensors and resulting from said generated Coriolis forces; and said signal processing means being responsive to said application of said separate signals for deriving said mass flow information.

10. The apparatus of claim 6 wherein said flow tube is oscillated at its fundamental frequency by said drive means.

11. The apparatus of claim 6 wherein said conduit includes a Tee pipe section and wherein said apparatus further comprises:

means for inserting said cover and said flow tube and said drive means and said sensor means and said support means into said conduit through an opening in said conduit perpendicular to the openings of said conduit through which said material flows.

12. The apparatus of claim 6 wherein said cover is oval shaped and wherein a portion of said conduit proximate said cover has a matching oval shape to provide a flow profile modification to accommodate the flow profile disturbance caused by the oval shape of said cover.

13. The apparatus of claim 6 in combination with funnel means connected to an inlet end of said flow tube to provide a flow profile modification to accommodate the flow profile disturbance caused by said flow tube in said conduit.

14. A method for driving mass flow information form material flowing in a conduit in a direction parallel to the longitudinal axis of said conduit, said method comprising the steps of:

positioning a flow tube inside a non-movable conduit with the longitudinal axis of said flow tube being non-movable and substantially parallel to said longitudinal axis of said conduit to enable the flow therethrough of a portion of a material flow through said conduit and with the effective cross sectional area of said flow tube being relatively small compared to the effective cross sectional area of said conduit;

operating drive means associated with said flow tube for imparting a transverse oscillatory motion to a portion of said flow tube;

operating flow tube sensor means for detecting the flexing motion of said flow tube caused by the Coriolis forces on said flow tube resulting from the flow of said material through said flow tube as said flow tube is oscillated by said drive means; and applying output signals from said flow tube sensor means to signal processing means for the generation of mass flow information pertaining to said material flow through said conduit.

15. A method for deriving mass flow information for material flowing in a conduit in a direction parallel to the longitudinal axis of said conduit, said method comprising:

positioning a substantially straight flow tube inside a nonmovable conduit;

said flow tube having a longitudinal axis that is non-movable and substantially parallel to the longitudinal axis of said conduit;

said flow tube being effective to enable the flow therethrough of a portion of a material flow through said conduit;

operating drive means affixed to a longitudinal center of said flow tube for imparting a transverse oscillatory motion to portions of said flow tube;

said flow tube being devoid of attachment to any structure other than said drive means;

associated sensor means with said flow tube for detecting the transverse flexing motion of flow tube caused by the Coriolis forces resulting from the flow of said material through said flow tube as said flow tube is oscillated transversely by said drive means; and applying output signals from said sensor means to signal processing means for the generation of mass flow information pertaining to said material flowing through said conduit.

16. The method of claim 15, wherein said drive means comprises a magnetostrictive driver.

17. The method of claim 15 wherein said flow tube is positioned in said conduit so that the exterior of said flow tube is in contact with material flowing through said conduit for enabling said flow tube to respond to Coriolis forces generated by flow of said material on both the inner and outer surfaces of said flow tube.

18. The method of claim 15 wherein said sensor means comprises:

a first sensor positioned near one end of said flow tube;

a second sensor positioned near a second end of said flow tube; and said method further comprising the step of applying separate signals from each of said first and second sensors to said signal processing means with said separate signals representing the separate transverse movement of portions of said flow tube resulting from said generated Coriolis forces; and said signal processing means being responsive to said application of said separate signals for deriving said mass flow information.

19. A method for deriving mass flow information for material flowing through a conduit, said apparatus comprising:

inserting a substantially straight flow tube inside a conduit so that a longitudinal axis of said flow tube is substantially parallel to the longitudinal axis of said conduit;

said flow tube enabling the flow therethrough of a portion of a material flow through said conduit;

imparting a transverse oscillatory motion to a portion of said flow tube with a drive means;

associating sensor means with said flow tube for detecting the transverse motion of said flow tube caused by the Coriolis forces resulting from the flow of said material through said flow tube as said flow tube is oscillated transversely by said drive means;

surrounding said flow tube with a cover to isolate said flow tube from material in said conduit whereby a transverse movement of said flow tube is unaffected by the viscosity of said material external to said flow tube in said conduit; and applying an output signal from said sensor means to signal processing means for the generation of mass flow information pertaining to said material flow through said conduit.

20. The method of claim 19 wherein said method further comprises the steps of:

sensing the pressure of said material flowing in said conduit; and maintaining an air space between the interior surface of said cover and the exterior surface of said flow tube with said air space having a pressure substantially equal to the pressure of said material flowing in said conduit.

21. The apparatus of claim 19 wherein:
said drive means is connected to a mid portion of said flow tube;
wherein a support means is connected to a first end and a second end of said flow to inhibit transverse movement of said ends of said flow tube; and
said sensor means comprises a first and a second sensor each of which is connected between said drive means and said support means.

22. The method of claim 21 in combination with the steps of:
applying separate signals from each of said first and second sensors to said measurement means with said signals representing the separate transverse movement of said portions of said flow tube associate with said sensors and resulting from said generated Coriolis forces; and
said signal processing means being responsive to said application of said separate signals for deriving said mass flow information.

23. The method of claim 19 wherein said flow tube is oscillated at its fundamental frequency by said driver means.

24. The method of claim 19 wherein said conduit includes a Tee pipe section and wherein said method further comprises the steps of:
inserting said cover and said flow tube and said drive means and said sensor means and said support means into said conduit through an opening in said conduit perpendicular to the openings of said conduit through which said material flows.

25. The method of claim 19 wherein said cover is oval shaped and wherein a portion of said conduit proximate said cover has a matching oval shape to provide a flow profile modification to accommodate the flow profile disturbance caused by the oval shape of said membrane.

26. The method of claim 19 in combination with the step of connecting funnel means to an inlet end of said flow tube to provide a flow profile modification to accommodate the flow profile disturbance caused by said flow tube in said conduit.

* * * * *

UNITED STATES PATENT AND TRADEMARK OFFICE
CERTIFICATE OF CORRECTION

PATENT NO. : 5,347,874
DATED : September 20, 1994
INVENTOR(S) : Paul Z. Kalotay and Joseph D. Titlow It is certified that error appears in the above-identified patent and that said Letters Patent is hereby corrected as shown below:

<u>Title page,</u>
Item [22] Filed, replace "Jan. 25, 1993" with -- Jan. 23, 1993 --

Signed and Sealed this

Twentieth Day of November, 2001

Attest:

*Nicholas P. Godici*

NICHOLAS P. GODICI
*Attesting Officer*     *Acting Director of the United States Patent and Trademark Office*